(No Model.) 2 Sheets—Sheet 1.
F. MOSSBERG.
MICROMETER GAGE.
No. 356,726. Patented Jan. 25, 1887.
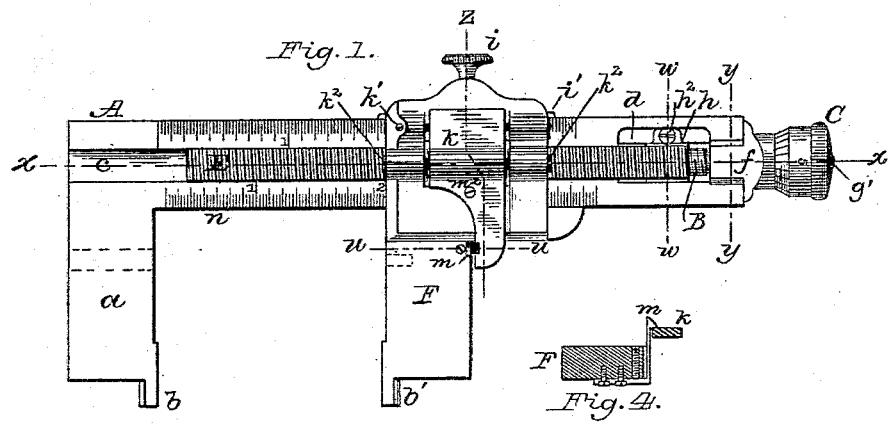
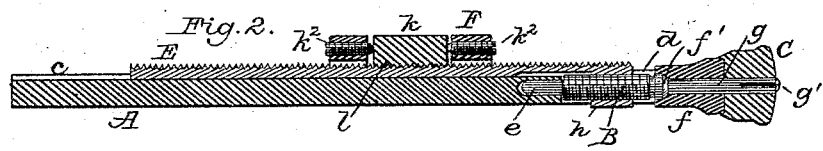
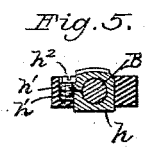
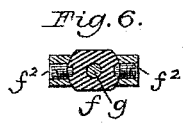
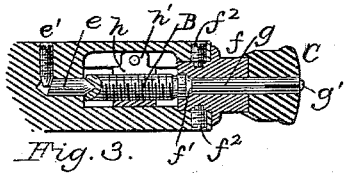
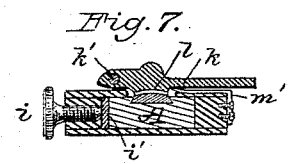
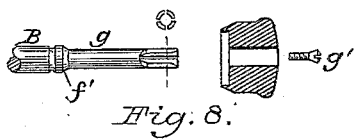
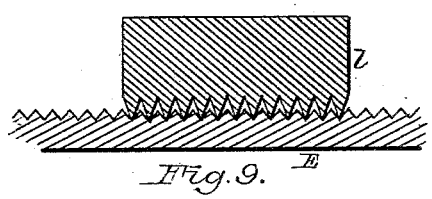
Attest:
Philip F. Larner.
Howell Bartle.
Inventor:
Frank Mossberg,
By
Attorney.

(No Model.) 2 Sheets—Sheet 2.
F. MOSSBERG.
MICROMETER GAGE.
No. 356,726. Patented Jan. 25, 1887.
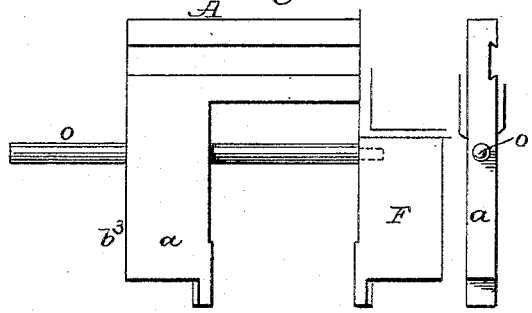
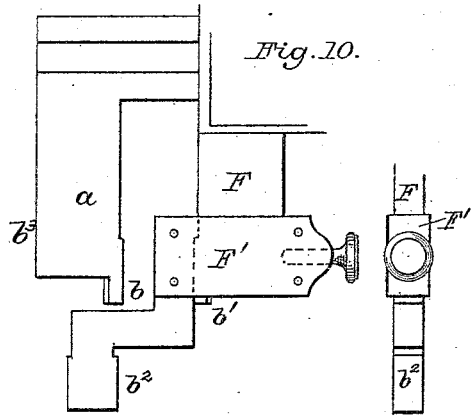
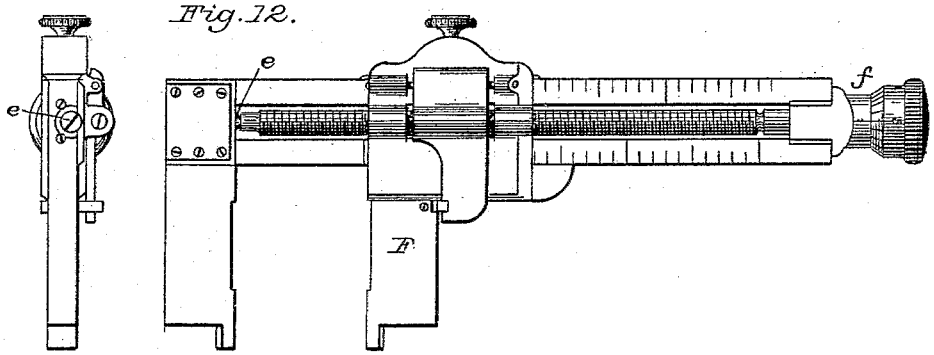
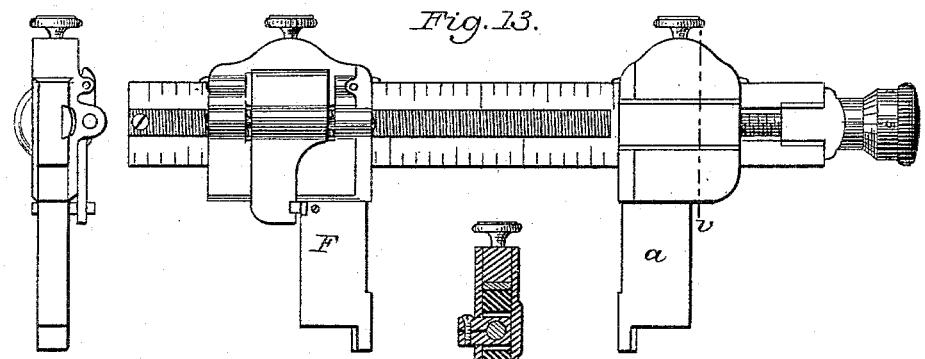
Attest:
Philip F. Larner.
Howell T. Battle.
Inventor:
Frank Mossberg,
By Wm C. Wood
Attorney.

UNITED STATES PATENT OFFICE.

FRANK MOSSBERG, OF PAWTUCKET, RHODE ISLAND, ASSIGNOR OF ONE-THIRD TO DANIEL McNIVEN, OF SAME PLACE.

MICROMETER-GAGE.

SPECIFICATION forming part of Letters Patent No. 356,726, dated January 25, 1887.

Application filed December 15, 1885. Serial No. 185,757. (No model.)

*To all whom it may concern:*

Be it known that I, FRANK MOSSBERG, a subject of the King of Sweden, residing at Pawtucket, in the county of Providence and State of Rhode Island, have invented certain new and useful Improvements in Micrometer Caliper Gages; and I do hereby declare that the following specification, taken in connection with the drawings furnished and forming a part of the same, is a clear, true, and complete description of my invention.

The main object of my invention is an absolutely accurate gage, susceptible of varied uses, capable of adjustment at each and every point wherein a wear of contacts would derange accuracy, and which can be produced at reasonable cost.

Certain portions of my invention can be employed in caliper-gages otherwise varied in construction; but when all of said improvements are embodied in what I deem their best form my gage has a shank or beam having a rigid rectangular head or jaw at one end thereof, a sliding serrated bar on said shank controlled longitudinally by a gage-screw, and a movable rectangular head or jaw which slides on said shank, and has a locking-plate by which it may be secured to said bar or detached therefrom and moved independently thereof. A caliper-gage as thus briefly described is believed to be broadly new, with or without certain novel features which I have devised and embodied therein, and which can also be employed with equally desirable results in caliper-gages having no sliding serrated bar, but in lieu thereof a gage-screw which extends throughout the length of the shank, and are equally applicable to caliper-gages having a head or jaw which is moved by a gage-screw, and a second head or jaw which is movable but wholly independent of said screw.

I employ two graduated scales, as in gages heretofore, one for inside, and the other for outside, measurements.

The sliding head of my gages has a set-screw for locking the head at any desired position, and said screw also co-operates with gibs for the compensation of wear as between it and the shank, as in prior gages.

The sliding heads of prior gages have had locking-plates provided with half-nuts for engaging with and disengaging said head from a rotating gage-screw, and, while I employ a similar locking-plate, I have for the first time hinged or pivoted it upon a pintle, so as to enable said plate to be adjusted in line with its pivot or lengthwise of the shank, and independently of the head on which said plate is mounted, and have for that purpose introduced set-screws, which abut against the edges of said plate and enable it to be accurately adjusted on the sliding head. This construction of said locking-plate enables its accurate adjustment with relation to a serrated sliding bar, or to a rotating gage-screw, or to a stationary serrated bar, said plate in either case having a serrated block or half-nut on its under side for engaging with the serrations or threads on the bar or on the screw, as the case may be.

Another radically novel feature is the combination, with the sliding head, of a detachable auxiliary head which projects beyond the tip of the rigid head, and presents a contact-surface parallel with the outer side or edge of said rigid head, and enables the gage to be used as a height-gage, the said outer side or edge of said rigid head then serving as one of the contact-points.

Another radically novel feature, in a caliper-gage, is the combination, with the rigid and the sliding heads, of a detachable tip in the form of a rod or bar coupled to and moving with the sliding head, parallel with the shank of the gage, and through guide-bearings in or on the rigid head, so that the end of said tip will serve as one contact-point, and the outer edge of said rigid head serve as a co-operating contact-point in enabling the gage to be used as a depth-gage. These detachable tips being attached to the movable or sliding head enable the gage-screw to control both, and with the same degree of accuracy as it would control the movable head when free from said tips, and the same scales or graduations are relied upon, due consideration being given to such variations as to starting-points as would necessarily be involved in the use of said attachments.

My gages also involve certain novel features in connection with the gage-screw, whether this be solely relied upon for engagement with the sliding head, or with the sliding bar serving as an intermediate connection. One of said features consists in providing the outer end of the gage-screw with a longitudinally-adjustable center-pin, whereby said screw may be advanced endwise to compensate for any wear at either or both ends. In a gage having a short gage-screw and the serrated sliding bar coupled thereto said center-pin is inclined at its butt, and a transverse adjusting-screw engages with said inclined surface, so that the inward movement of said adjusting-screw will cause a longitudinal movement of the center-pin in a direction at right angles to the axis of said screw and in line with the axis of the gage-screw; but in a gage having no sliding serrated bar said center-pin is itself threaded and serves also as an adjusting-screw. In both forms of gages the gage-screw has a detachable solid housing or bearing for its neck, as distinguished from an open or two-part bearing, as heretofore used. This neck has a bearing-shoulder at the inner end of said bearing, and is hollow, split, and internally threaded at its outer end, and passes through a central opening in the graduated thumb-piece, and is firmly coupled thereto by means of a screw entering said hollow neck and expanding it, and, if need be, enabling the compensation for any and all wear which may occur between said shoulder and the bearing, and also for such wear as may occur at the coincident surfaces of the inner end of said thumb-piece and the solid housing or bearing.

After fully describing my gages, as illustrated in the drawings, the several novel features hereinbefore referred to and certain others of minor importance will be duly specified in the several clauses of claim hereunto annexed.

Figure 1 illustrates in side view one of my caliper-gages in what I deem its best form. Fig. 2 is a longitudinal central section of the same on line $x$, Fig. 1. Fig. 3 is a longitudinal section of one end of the same in a plane at right angles to the section, Fig. 2. Figs. 4, 5, 6, and 7, respectively, illustrate sections on lines $u$, $w$, $y$, and $z$, Fig. 1. Fig. 8, in several views, illustrates the neck of the gage-screw, a graduated thumb-piece, and the screw by which they are coupled. Fig. 9, in an enlarged section, illustrates the difference between the serrations in the open nut and those in the bar or in a gage-screw. Fig. 10, in two views, illustrates my "height-gage" attachment. Fig. 11, in two views, illustrates my "depth-gage" attachment. Fig. 12, in two views, illustrates another form of my gage, and having no sliding bar. Fig. 13, in two views, illustrates another form of gage embodying many of my improvements. Fig. 14 is a sectional view of Fig. 13 on line $v$.

The shank or beam A of the gage has a head, $a$, preferably integral therewith, which serves as one of the caliper-jaws, and has a tip, $b$, of the usual form in such gages as are adapted to operate as inside and outside calipers. At one side of said shank it is longitudinally recessed, as at $c$, and near one end said shank is chambered, as at $d$, and open-slotted beyond this chamber to what may be termed the inner end of the shank.

Within the chamber $d$ the gage-screw B is located and rotatively mounted at one end upon a center-pin, $e$, and at its opposite end in a solid bearing or housing, $f$. The center-pin, $e$, is accurately fitted to a central longitudinal hole in the shank, so as to be capable of lengthwise movement therein, and its rear end is inclined or beveled, so that the inner end of the transverse adjusting-screw $e'$ will obliquely abut against said inclined surface, and cause the center-pin to be advanced as a result of turning said screw inwardly. At the opposite end of the threaded portion of the gage-screw there is an annular abutting shoulder at $f'$, which is accurately fitted to a seat in the housing $f$, and this latter is secured in the open slotted end of the shank by oppositely-located transverse screws $f^2$. Said gage-screw has beyond its shoulder $f'$ a neck, $g$, fitted to a bearing in said housing, and at its outer end said neck is hollow, split, and internally threaded, and extends into and nearly through a central opening in the thumb-piece C, and it is rigidly coupled thereto by means of the screw $g'$, having a tapered head fitted to a corresponding seat in the split neck. This thumb-piece is cylindrical, and is chambered at its inner face so as to inclose the outer cylindrical end of the housing $f$, this latter having on its upper side the usual zero-line, and the periphery of the inner end of the thumb-piece having the usual graduations. This mode of connecting the thumb-piece with the screw results in a reliable union, but nevertheless conveniently enables a rotative adjustment of the thumb-piece on the screw, and also provides for a compensation for wear, if needed.

Within the longitudinal recess $c$ in the side of the shank there is a sliding bar, E, preferably having inclined edges to fit the correspondingly-inclined sides of said recess, so as to secure said bar therein while leaving it free to be moved longitudinally. At one end this bar is provided with a block, $h$, preferably integral therewith, bored longitudinally and tapped to fit the gage-screw. This block is split at one side and provided with ears $h'$, bored and tapped to receive an adjusting-screw, $h^2$, by means of which lost motion as between said block and the gage-screw may be wholly obviated. This sliding bar E has on its outer side or face a series of uniform serrations, scores, or threads, and these in their best form are diagonal, or, in other words, segments of screw-threads, said bar being, in fact, a longitudinal section of a large screw, which is first carefully and accurately threaded and then sawed into as many bars as its dimensions will warrant.

The sliding head or jaw F is, as heretofore, fitted to surround the shank and slide thereon, and has a tip, $b'$, and a set-screw, $i$, and gibs $i'$, by which said head may be firmly set at any desired adjustment, and also by which such wear as may occur between said head and shank can be taken up. This sliding head has a pivoted locking-plate, $k$, which, when broadly considered, is similar to others heretofore used on gages having no serrated sliding bar; but it differs from all others known to me in that it is hinged upon a pivot, $k'$, which permits it to be moved sidewise on the head; or, in other words, it can be moved slightly to and fro parallel with the axis of the gage-screw independently of the head on which said locking-plate is mounted, and, also, in that said locking-plate is made adjustable as to said capacity for independent movement on said head. I employ for this purpose two adjusting-screws, $k^2$, which are tapped into lugs on the sliding head at each side of said locking-plate, so that the rounded inner ends of said screws abut smoothly against the coincident edges of said plate and securely confine it to its pivotal movement toward and from the serrated bar. At the under side of said locking-plate and integral therewith, or rigidly attached thereto as a part thereof, there is what may be termed a "half-nut" or an open or segmental nut, $l$, whether it engage directly with a gage-screw or with a serrated bar coupled to a gage-screw, and whether said bar be merely notched, or is, as already described, a section of a screw. This half-nut is, however, novel in that instead of having its serrations exact counterparts, as heretofore, of the threads or notches with which they engage, they are only counterparts in having the same number of threads or serrations to the inch, the half-nut having deeper spaces between the serrations or threads than the bar or the screw, so that the engagement therewith by the nut will not be impaired by the presence of any foreign matter liable to accumulate at such points of contact. If said nut be serrated, as with a V-thread, said serrations have a sharper angle than those of the bar or the screw, thus leaving a space between the crowns of the serrations or teeth on the bar or the screw and the coincident surface of the nut, as clearly illustrated in Fig. 9.

The locking-plate is provided with an adjustable locking spring-latch, $m$, and with a relief-spring, $m'$, by which said plate is lifted and held free from the bar whenever it is disengaged from its latch. A stop-screw, $m^2$, limits the clasping movement of the locking-plate.

I employ, as heretofore, a special scale, as at $n$, for inside caliper measurement, and, as shown, said scale is located upon the face of the shank near its inner edge, the other scale, shown at the outer edge, being adapted to outside measurements.

As thus far described in detail my calipers are only capable of serving for inside and outside measurements in the usual manner; but for enabling it to be also used as a height-gage I have devised an auxiliary head, $F'$, which has a tip, $b^2$, and it is so applied to the sliding head F that said tip $b^2$ is in substance a prolongation of the tip $b'$ extended beyond the tip $b$ on the stationary head, and so arranged that one side of the tip $b^2$ serves as one contact-point, co-operating with the surface $b^3$ at the outer edge of the fixed head as another contact-point. It will be seen that if the gage be placed with its fixed head standing upon a flat surface the tip $b^2$ of the auxiliary head can be moved by its screw until it is also in contact with an adjacent raised surface, and that the height of the latter will be accurately indicated on the scale. The auxiliary head is provided with a socket for receiving the outer end of the head F and a set-screw for locking it on said head. It is advisable that when the contact-surfaces $b^2$ and $b^3$ occupy the same plane the indicating-edge of the head F should stand, say, upon an inch-mark, or on a half-inch mark, on either one of the scales, thus enabling the measurements to be readily read from said scale.

For enabling the instrument to be used as a depth-gage, I have provided another tip, $o$, which, while preferably detachable, may be permanently mounted upon the sliding head F, inasmuch as it would seldom, if ever, interfere with inside and outside measurements; but when the auxiliary head F' is used said tip $o$ must obviously be removed. This depth-gage tip $o$ is in the form of a bar or rod attached to the sliding head F, so as to project therefrom beyond the rigid head $a$, at right angles thereto and parallel with the shank. As the sliding head is moved to and fro the depth-gage tip is correspondingly moved longitudinally, and for guiding it a bearing is provided at the rigid head, preferably in the form of a hole through it, as shown. The outer end of said rod serves as one contact-point, and the surface $b^3$ of the fixed head co-operates therewith, thus enabling the depth of a hole or the location of annular shoulders thereon, to be readily determined by means of either one of the scales.

The character of the graduations of either of the two scales and also those on the thumb-piece, as well as the number of threads to the inch on the gage-screw, can obviously be indefinitely varied without in any manner affecting any portion of my invention. In practice, however, I have found it desirable to provide for measurements of one one-thousandth of an inch, the screw having forty threads, the scale-graduations being fifths, tenths, and fortieths, and the thumb-piece twenty-fifths.

I have hereinbefore stated that the serrated sliding bar coupled to a short gage-screw is preferred by me to the long gage-screw without said bar. My reasons for this are that the screw, if long, can be so imperfectly backed or supported that it is liable to spring when the locking-plate is forced into proper position thereon. The bar, on the other hand, is backed up throughout nearly all of its length by the shank, and hence it cannot be sprung; also, the short gage-screw is comparatively inexpensive, and several of the bars, if they be sections of a screw, can be threaded or serrated and cut into sections at a cost but little greater than a corresponding length of gage-screw. Again, in cutting the thread on a gage-screw small enough in diameter to be used in an ordinary gage, the screw is liable to spring and thus derange its accuracy. Again, if a serrated bar or a short gage-screw be worn or injured, either or both can be replaced by another at much less cost than a single long gage-screw. It will, however, be obvious that many of the improvements already described are applicable to gages having a long gage-screw—as, for instance, as illustrated in Fig. 12. In this case the sliding head F is precisely as before described, and the same is true of the hollow neck of the screw, its housing, its graduated thumb-piece, and tapered screw. The center-pin, e, in this case is threaded, and is fitted to a tapped hole coincident with the outer end of the gage-screw. The longitudinal recess or groove in the face of the shank for receiving the gage-screw is extended from end to end, the housing f being fitted thereto at one end and secured by transverse screws, as in the gage first described. The center-pin hole at the other end is within a block fitted to said groove, and said block is secured against lateral displacement by means of a screwed cap-plate, as clearly shown, and against outward or longitudinal displacement by screws in the end of the shank, having flaring heads in countersunk holes and overlapping two opposite edges of said block.

When a caliper-gage embodying many of my improvements is to be limited in its capacities to inside or to outside measurements, or to both, it may be constructed as shown in Fig. 13, wherein both heads are movable, the head F being a sliding head, precisely as before described, and arranged to engage with a stationary bar which is wholly disconnected from the gage-screw, but is otherwise as before described. The head a in this case is provided with a split nut and an adjusting-screw, as with the sliding bar before described; but it engages directly with the gage-screw, as heretofore in prior gages. The gage-screw, its adjustable center-pin, its housing, and thumb-piece are all, as already described, in connection with the gage shown in Fig. 1.

Having thus described my invention, I claim as new and desire to secure by Letters Patent—

1. In a caliper-gage, the combination, substantially as hereinbefore described, of a rotative gage-screw, a serrated sliding bar coupled to and moved longitudinally by said gage-screw, and a sliding head provided with a locking-plate for detachably coupling said head to said bar.

2. In a caliper-gage, the combination of a sliding head, a gage-screw, and a sliding bar coupled to said screw and provided with diagonal serrations, and a locking-plate on said head for detachably engaging with said bar, substantially as described.

3. In a caliper-gage, the combination of the graduated beam, the short gage-screw, and the serrated bar sliding in said beam and provided with a split nut embracing said gage-screw, substantially as described.

4. In a caliper-gage, the combination of the graduated beam, the sliding head, the gage-screw, a fixed abutment for said screw, near one end thereof and at one end of said beam, and a longitudinally-adjustable center-pin at the opposite end of said screw, substantially as described.

5. In a caliper-gage, the combination, with a graduated beam, a sliding head, and a rotative gage-screw having a hollow internally-threaded split neck, of a graduated thumb-piece axially bored to receive said neck, and an expanding-screw entering said slotted neck and firmly setting said thumb-piece thereon, substantially as described.

6. In a caliper-gage, the combination, with a graduated beam and sliding head, of a gage-screw having near one end an abutting annular shoulder and a neck, a solid housing having a bearing for said neck and also for said shoulder, and a graduated thumb-piece on said neck, substantially as described.

7. In a caliper-gage, the combination of a sliding head and a locking-plate thereon, which is pivoted thereto and is adjustable to and fro on the line of its pivot, substantially as described.

8. The combination of the gage-screw, its center-pin having a beveled or inclined rear end, and the transverse adjusting-screw abutting against the beveled end of said center-pin, substantially as described.

9. In a caliper-gage, the combination, with a sliding head, of a locking-plate provided with serrations of a number to the inch equal to those with which said plate engages, but having deeper intervening spaces, substantially as and for the purposes described.

10. In a caliper-gage, the combination, substantially as described, of a graduated beam, a rigid head, a sliding head, a gage-screw, and an auxiliary head detachably mounted upon said sliding head for co-operating with the rigid head in making height measurements.

11. In a caliper-gage, the combination, substantially as described, of a graduated beam, the rigid head, the sliding head, a gage-screw, and a rod or bar detachably mounted upon said sliding head and projecting beyond and at right angles to the rigid head for co-operating with said rigid head in making depth measurements.

FRANK MOSSBERG.

Witnesses:
WM. H. PARK,
WILLIAM G. ARNOLD.